(12) United States Patent
Agarwal et al.

(10) Patent No.: US 6,512,019 B1
(45) Date of Patent: Jan. 28, 2003

(54) POLYPROPYLENE COPOLYMER FOAMS AND THEIR USE

(75) Inventors: Pawan Kumar Agarwal, Houston, TX (US); Aspy K. Mehta, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 160 days.

(21) Appl. No.: 09/702,326

(22) Filed: Nov. 1, 2000

Related U.S. Application Data
(60) Provisional application No. 60/163,641, filed on Nov. 4, 1999.

(51) Int. Cl.$^7$ ................................................. C08J 9/00
(52) U.S. Cl. ...................... 521/134; 521/81; 521/142; 521/143
(58) Field of Search ................................ 521/142, 143, 521/134, 81

(56) References Cited

U.S. PATENT DOCUMENTS

| | | |
|---|---|---|
| 4,665,208 A | 5/1987 | Welborn, Jr. et al. |
| 4,701,432 A | 10/1987 | Welborn, Jr. |
| 4,808,561 A | 2/1989 | Welborn, Jr. |
| 4,874,734 A | 10/1989 | Kioka et al. |
| 4,908,463 A | 3/1990 | Bottelberghe |
| 4,921,825 A | 5/1990 | Kioka et al. |
| 4,923,833 A | 5/1990 | Kioka et al. |
| 4,924,018 A | 5/1990 | Bottelberghe |
| 4,931,417 A | 6/1990 | Miya et al. |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,145,819 A | 9/1992 | Winter et al. |
| 5,198,401 A | 3/1993 | Turner et al. |
| 5,204,419 A | 4/1993 | Tsutsui et al. |
| 5,206,199 A | 4/1993 | Kioka et al. |
| 5,235,081 A | 8/1993 | Sangokoya |
| 5,239,022 A | 8/1993 | Winter et al. |
| 5,240,894 A | 8/1993 | Burkhardt et al. |
| 5,243,001 A | 9/1993 | Winter et al. |
| 5,248,801 A | 9/1993 | Sangokoya |
| 5,276,208 A | 1/1994 | Winter et al. |
| 5,296,434 A | 3/1994 | Karl et al. |
| 5,304,614 A | 4/1994 | Winter et al. |
| 5,308,815 A | 5/1994 | Sangokoya |
| 5,329,032 A | 7/1994 | Tran et al. |
| 5,329,033 A | 7/1994 | Spaleck et al. |
| 5,374,752 A | 12/1994 | Winter et al. |
| 5,455,366 A | 10/1995 | Rohrmann et al. |
| 5,510,502 A | 4/1996 | Sugano et al. |
| 5,532,396 A | 7/1996 | Winter et al. |
| 5,543,373 A | 8/1996 | Winter et al. |
| 5,643,847 A | 7/1997 | Walzer, Jr. |
| 5,672,668 A | 9/1997 | Winter et al. |
| 6,051,727 A | 4/2000 | Küber et al. |
| 6,313,184 B1 * | 11/2001 | Sasaki et al. |
| 2002/0006976 A1 * | 1/2002 | Subreamonian et al. |
| 2002/0111389 A1 * | 8/2002 | Chaudhary et al. |

FOREIGN PATENT DOCUMENTS

| | | |
|---|---|---|
| EP | 0 570982 A1 | 11/1983 |
| EP | 0 277003 A1 | 8/1988 |
| EP | 0 277004 A1 | 8/1988 |
| EP | 0279586 B1 | 8/1988 |
| EP | 0 279863 | 8/1988 |
| EP | 0 354893 | 2/1990 |
| EP | 0 426637 A2 | 5/1991 |
| EP | 0 495375 A | 7/1992 |
| EP | 0 500944 A | 9/1992 |
| EP | 0 520732 A | 12/1992 |
| EP | 0 561 476 A | 9/1993 |
| EP | O 594218 B1 | 4/1994 |
| EP | 0611773 B1 | 8/1994 |
| EP | 0 611 795 A | 8/1994 |
| EP | 0 573403 A | 4/1998 |
| WO | WO 91/09882 | 7/1991 |
| WO | WO 92/00333 A | 1/1992 |
| WO | WO 94/03506 | 2/1994 |
| WO | WO 94/10180 | 5/1994 |
| WO | WO 94/28034 | 12/1994 |
| WO | WO 96/00243 | 1/1996 |
| WO | WO 96/00245 | 1/1996 |
| WO | WO 96/04319 | 2/1996 |
| WO | WO 98/014585 | 4/1998 |
| WO | WO 98/22486 | 5/1998 |

OTHER PUBLICATIONS

U.S. patent application Ser. No. 09/184,389.
U.S. patent application Ser. No. 08/248,284.
U.S. patent application Ser. No. 08/916,699.

* cited by examiner

*Primary Examiner*—Morton Foelak
(74) *Attorney, Agent, or Firm*—Kevin M. Faulknen (57) ABSTRACT

This invention relates generally to foamable crystalline propylene polymers obtained from metallocene catalysis and to their methods of production. The foamed crystalline propylene polymers have molecular weight distributions and densities that fall within broad ranges. The crystalline propylene polymers may be prepared in a multiple stage polymerization process using a combination of metallocene components in at least two stages.

18 Claims, 5 Drawing Sheets

Fig. 1

Sample 1

$M_n = 114,100$
$M_w = 352,000$
$M_w/M_n = 3.09$
Compliance = 3.9

Sample 2A

$M_n = 106,200$
$M_w = 385,600$
$M_w/M_n = 3.63$
Compliance = 5.2

Sample 2B $M_n = 112,990$
$M_w = 321,860$
$M_w/M_n = 2.85$
Compliance = 4.0

POLYPROPYLENE COPOLYMER FOAMS AND THEIR USE

This Application is based on U.S. Provisional Application No. 60/163,641 filed Nov. 4, 1999.

FIELD OF THE INVENTION

This invention relates generally to foamed polypropylene copolymers, their uses and to the methods of their production.

BACKGROUND

Among the three most versatile commodity plastics, which are polyethylene (PE), polystyrene (PS) and polypropylene (PP), polypropylene is considered to possess the most favorable properties profile of the three for a variety of applications. These applications include, for example, oriented and non-oriented films, textile fibers, nonwovens and a variety of injection molded parts. Comparing the properties, it is well known that polypropylene has a higher modulus and heat deflection temperature (HDT) than polyethylene. The higher the modulus and HDT, the more suited the polymer is for durable applications in the appliance and automotive segments. Additionally, because polypropylene is nonpolar, it resists degradation by common solvents, such as acids and alkalis. Compared to polystyrene, polypropylene is preferred in applications requiring good organoleptic performance, high barrier properties and the living hinge property. Finally, polypropylene blends well with a variety of other polymers, and in impact-modified form occupies a dominant position in the automotive industry in the areas of bumpers, side panels, floor mats, dashboards and instrument panels.

However, there exist some polymer applications where polypropylene is not the preferred plastic of choice. Examples of such polymer application areas include thermoforming and foaming. Foamed polymers find usage in automotive, marine, appliance and packaging applications because of their good insulating and structural properties at low added weight. Thermoforming is a popular fabricating mode that competes favorably with injection molding in the making of thin-walled containers. Polypropylene's deficiencies in foaming and thermoforming are believed to be related to its generally poor melt strength and rapid melt viscosity drop, poor sheet sag and comparatively slow crystallization kinetics. For example, to successfully foam an article formed from a polyolefin, it is desirable that the polyolefin selected for foaming possess high melt strength. With high melt strength, the bubble growth rate within the polyolefin can be controlled without premature bursting. Controlling bubble growth rate is also important for ensuring a uniform distribution of cell sizes, which leads to greater product uniformity. Additionally, broader polymer processing temperature windows are desirable so that when the polymer is used in an article forming process, the temperature variances along the process line are less disruptive to the fabrication of a quality product.

SUMMARY OF THE INVENTION

It has been discovered that propylene polymers prepared in multistage reactors that exhibit broad molecular weight distribution and broadened melting ranges offer the capability to provide better control during foam fabrication than do traditional propylene polymers. The final product is anticipated to be a better quality foam. The present invention is directed toward such a foamed polypropylene having improved characteristics such as stretchability, tensile strength, and broader processing temperature windows.

Specifically, this invention relates to a crystalline propylene polymer foam comprising (i) from 10 to 90 weight percent isotactic crystalline propylene homopolymer having a molecular weight distribution (Mw/Mn) less than 3.0 and (ii) from 90 to 10 weight percent crystalline propylene copolymer including propylene units and comonomer units, wherein the crystalline propylene copolymer has a molecular weight distribution less than 3.0, and wherein the comonomer weight percent based on the total crystalline propylene polymer weight is in a range from 0.1 to 5. The crystalline propylene polymer has a molecular weight distribution (Mw/Mn) in a range from 2.1 to 10. This polymer, when used in state-of-the-art foam fabricating equipment, is anticipated to yield foams with low product densities of less than 0.3 g/cm$^3$.

In another embodiment, a crystalline propylene polymer foam is provided which comprises (i) from 10 to 90 weight percent crystalline propylene homopolymer having a molecular weight distribution less than 3.0 and a first molecular weight in the molecular weight range from 25,000 Mw to 300,000 Mw and (ii) from 90 to 10 weight percent crystalline propylene copolymer including propylene units and comonomer units. The crystalline propylene copolymer has a molecular weight distribution less than 3.0 and a second molecular weight greater than the first molecular weight. The crystalline propylene polymer has a molecular weight distribution (Mw/Mn) in a range from 2.1 to 10. The comonomer weight percent, based on total crystalline propylene polymer weight, is in a range from 0.1 to 5. Foams with densities down to less than 0.3 g/cm$^3$ are anticipated on state-of-the-art foam fabricating equipment.

In yet another embodiment, a crystalline propylene polymer foam is provided which comprises (i) from 30 to 70 weight percent crystalline highly isotactic propylene homopolymer having a molecular weight distribution less than 2.5 and a first molecular weight in a range from 25,000 Mw to less than 300,000 Mw; and (ii) from 70 to 30 weight percent crystalline propylene copolymer including propylene units and comonomer units. The crystalline propylene copolymer has a molecular weight distribution less than 2.5 and a second molecular weight greater than the first molecular weight. The comonomer weight percent, based on total crystalline propylene polymer weight, is in a range from 0.8 to 2. The comonomer may be selected from a group consisting of ethylene, and alpha olefins, such as 1-butene, 1-pentene, 1-hexene, and 1-octene or a combination thereof. The crystalline propylene copolymer has a molecular weight distribution (Mw/Mn) in a range from 2.5 to 7.0, a weight average molecular weight in a range from 200,000 to 400,000 and a melt flow rate in a range from 0.5 dg/min to 20.0 dg/min. From such polymers, foams with densities down to less than 0.3 g/cm$^3$ are anticipated on state-of-the-art equipment In yet another embodiment, a process for preparing a foamed crystalline polypropylene polymer is provided. The process steps comprise (a) polymerizing propylene in a first stage, (b) copolymerizing propylene and a comonomer in a second stage in the presence of the product of the first stage, (c) recovering crystalline propylene polymer comprising from 0.05 to 15 weight percent comonomer units based on the total weight of the polymer and (d) processing the crystalline polypropylene polymer so that when the crystalline polypropylene polymer is contacted with a foaming agent, a foamed crystalline polypropylene polymer is formed. The polymerization steps (a) and (b) are desirably conducted in the presence of a metallocene catalyst system comprising at least two different metallocene catalyst components.

DETAILED DESCRIPTION OF THE INVENTION

Crystalline Propylene Polymer

The propylene polymer foam resins of this invention are a reactor blend of crystalline propylene homopolymer (hereinafter referred to as "homopolymer") and a copolymer (hereinafter referred to as "copolymer") preferably formed under polymerization conditions in the presence of two or more metallocene catalyst systems. The propylene polymer formed from the reactor blend comprises from 10 to 90 weight percent homopolymer based on the total weight of the propylene polymer, desirably from 20 to 80 weight percent, even more desirably from 30 to 70 weight percent homopolymer based on the total weight of the propylene polymer. Hereinafter, the reaction product of the homopolymer and copolymer will be referred to as the "propylene polymer product" or simply "propylene polymer". Once the propylene polymer product is subjected to the foaming step, it will be referred to as "polypropylene foam".

Any comonomer may be used to make the polymers of this invention. Desirably, the comonomer is selected from the group consisting of ethylene, and alpha olefins, such as for example, 1-butene, 1-pentene, 1-hexene, and 1-octene. Combinations of comonomers and substituted comonomers such as 4-methylpentene-1 can also be used. The most desirable of these comonomers are ethylene, 1-pentene, and 1-hexene. Diolefins and cyclic olefins may also be used.

The copolymer desirably has a weight average molecular weight (Mw) that is in the range of from 140,000 to 750,000 desirably from 150,000 to 500,000, and most desirably from 200,000 to 400,000. This weight average molecular weight range of the propylene polymer may be achieved by the polymerization process described below. The resulting propylene polymer product from the homopolymer and copolymer reaction blend has both a low molecular weight polymer species and a high molecular weight polymer species. The low molecular weight polymer species may have a molecular weight in the range of from 25,000 to 300,000, desirably from 100,000 to 300,000. The high molecular weight polymer species may have a molecular weight in the range of from greater than 300,000 to 1,500,000, desirably from greater than 300,000 to 1,000,000. Desirably, the homopolymer is present in the low molecular weight species and the copolymer is present in the high molecular weight species.

The propylene polymer product desirably has a melt flow rate (MFR) that is in the range of from 0.2 dg/min. to 30 dg/min., desirably from 0.5 dg/min. to 20 dg/min., even more desirably from 1 dg/min. to 10 dg/min. The propylene polymer product has a molecular weight distribution ($M_w/M_n$) in the range of from 2.1 to 10.0; more desirably from 2.5 to 7.0.

The amount of comonomer used will depend on the type of comonomer and desired properties. The final composition may contain any amount of comonomer as long as the components of the composition remain crystalline. In general, the amount of comonomer units based on the total weight of the polymer may be in the range of from 0.05 to 15, desirably from 0.1 to 10, desirably from 0.5 to 8, desirably from 0.5 to 5, more desirably from 0.5 to 3 and most desirably from 0.8 to 2 weight percent based on the total weight of the propylene polymer. Conversely, the propylene polymer comprises from 99.95 to 85, desirably from 99.90 to 90, desirably from 99.5 to 92, desirably from 99.5 to 95, more desirably from 99.5 to 97.0 and most desirably from 99.2 to 98.0 weight percent propylene units based on the total weight of the propylene polymer.

The propylene polymer products of this invention also retain the low extractables levels characteristic of single-site metallocene-based polymers, which are typically under 2 weight percent, as measured by 21 CFR 177.1520(d)(3)(ii).

Desirably, the propylene polymers have a tailored composition distribution reflecting their homopolymer/copolymer makeup. The homopolymer and copolymer species derived from each metallocene will be narrow in composition distribution, typical for single site metallocene-based polymers. The final composition distribution will depend on the level of comonomer, the ratio of homopolymer to copolymer produced and the comonomer incorporating tendencies of the individual metallocenes. The design of the molecular weight distribution, tacticity distribution, and composition distribution of the final composition depends on the requirements of the targeted end application.

The propylene polymers of this invention can be blended with other polymers, particularly with other polyolefins. Examples of such would be blends with conventional propylene polymers.

Propylene Polymer Polymerization Processes

The propylene polymer polymerization process of the present invention involves the use of metallocene catalyst systems that include at least two metallocenes and an activator. Desirably, these catalyst system components are supported on a support material.

The propylene polymers are generally prepared in a multiple stage process wherein homopolymerization and copolymerization are conducted separately in parallel or, desirably in series. Desirably, the propylene polymer is prepared in a multiple stage, series, slurry loop reactor using propylene as the polymerization diluent. The polymerization is carried out using a pressure of from 200 kPa to 7,000 kPa at a temperature in the range of from 50° C. to 120° C.

Desirably, propylene units are homopolymerized in one stage and in a separate stage propylene units and polymerizable units of at least one comonomer are copolymerized in the presence of the initially produced homopolymer. If, however, the copolymer is prepared first, the subsequently prepared "homopolymer" is likely to contain some traces of comonomer.

The periods of time for each stage will depend upon the catalyst system, comonomer and reaction conditions. In general, propylene should be homopolymerized for a time period sufficient to yield a composition having from 10 to 90 weight percent homopolymer based on the total weight of the propylene polymer, desirably from 20 to 80 weight percent, even more desirably from 30 to 70 homopolymer weight percent based on the total weight of the propylene polymer.

While the copolymer polymerization process described herein relates to a multiple stage, series, slurry loop reactor, it will be understood that the copolymer polymerization process may be conducted in batch or continuous mode and the entire polymerization may take place in one reactor or, desirably, the polymerization may be carried out in a series of reactors. If reactors in series are used, then the comonomer may be added to any reactor in the series, however, desirably, the comonomer is added to the second or subsequent reactor.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will affect the molecular weight distribution of the polymer product accordingly. Desirably, the comonomer is present in the higher molecular weight species of the polymer formed by this process. As such, generally lower levels of hydrogen are utilized during copolymerization as compared to the hydrogen levels used during homopolymerization.

Metallocene Catalysts

Desirably, the metallocenes selected for use in this invention are two or more different metallocenes which, when used alone, produce isotactic, crystalline propylene polymer and when used in combination, produce the propylene polymer having the attributes described above. Particularly, these metallocenes are those which when used alone to produce propylene homopolymer, are capable of producing an isotactic polymer having a weight average molecular weight of from 25,000 to 1,500,000 at commercially attractive temperatures of from 50° C. to 120° C. More desirably, two or more metallocenes are selected which produce polymers having different molecular weights, wherein the combination of such polymers results in a final polymer product having a broad molecular weight distribution.

Most desirably, the catalyst system used in the propylene polymer polymerization process includes one metallocene that is capable of producing propylene homopolymer at polymerization temperatures of from 50° C. to 100° C. having a molecular weight in the range of from 25,000 to less than 300,000, desirably from 100,000 to less than 300,000. Desirably, the other metallocene is capable of producing propylene homopolymer at the same temperature that has a molecular weight in the range of from 300,000 to 1,500,000, desirably from 300,000 to 1,000,000. Desirably, each metallocene produces a polymer component having a molecular weight distribution of less than 3, desirably less than 2.8 and more desirably less than 2.5.

In addition to the different molecular weight responses of the metallocenes, the incorporation of $\leq 1$ wt % ethylene comonomer during the copolymer polymerization process can result in a broadening of the molecular weight distribution at the high molecular weight end. The broadening of the molecular weight distribution at the high molecular weight end is unexpected. This is so because when the respective metallocenes are used individually in propylene polymerization, the molecular weight of the polymer drops with ethylene addition.

Additional broadening of molecular weight distribution may be practiced through reactor process techniques. For example, operating the different stages of a multiple stage polymerization process with varying levels of hydrogen, a molecular weight regulator, is known in the art to produce broadening of molecular weight distribution.

Desirable metallocenes are selected from the following groups: rac-dimethylsilandiylbis(2-methylindenyl) zirconium dichloride; dimethylsilandiylbis(2,4-dimethylindenyl)zirconium dichloride; dimethylsilandiylbis(2,5,6-trimethylindenyl)zirconium dichloride; dimethylsilandiylbis indenyl zirconium dichloride; dimethylsilandiylbis(4,5,6,7-tetrahydroindenyl)zirconium dichloride and dimethylsilandiylbis(2-methyl-4,5-benzoindenyl)zirconium dichloride and (ii) the other metallocene is selected from the group that includes rac-: dimethylsilandiylbis(2-methyl-4-phenylindenyl)zirconium dichloride; dimethylsilandiylbis(2-methyl-4,6-diisopropylindenyl)zirconium dichloride; dimethylsilandiylbis(2-methyl-4-napthylindenyl)zirconium dichloride; and dimethylsilandiylbis(2-ethyl-4-phenylindenyl)zirconium dichloride.

Many of these desirable transition metal compound components are described in detail in U.S. Pat. Nos. 5,145,819; 5,243,001; 5,239,022; 5,329,033; 5,296,434; 5,276,208; 5,672,668, 5,304,614 and 5,374,752; and EP 549 900 and 576 970 all of which are herein fully incorporated by reference for purposes of U.S. patent practice.

Additionally, metallocenes such as those described in U.S. Pat. Nos. 5,510,502, 4,931,417, 5,532,396, 5,543,373, WO 98/014585, EP611 773 and WO 98/22486 (each fully incorporated herein by reference for purposes of U.S. practice) are suitable for use in this invention.

The ratio of metallocenes used in polymerization will depend partly on the activities of the metallocenes and on the desired contribution of each. Thus, for example, if two metallocenes are used in a 1:1 ratio and the activities of each are similar, then the polymer product will be expected to comprise 50% of polymer produced by one metallocene and 50% of polymer produced by the other. The breadth of the product's molecular weight distribution will depend at least partly on the difference in molecular weight capability between the metallocenes. The addition of comonomer and/or hydrogen in the polymerization process may further affect the contribution of each metallocene. In an alternative embodiment, a different set of metallocenes is used in each stage of polymerization.

The crystalline propylene polymer and polymerization process are further described in U.S. patent application Ser. No. 08/916,699 filed Aug. 22, 1997 which is incorporated in its entirety by reference herein for purposes of U.S. practice, which was based on U.S. Provisional Application Serial No. 60/025,398 filed Sep. 4, 1996.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain 5 to 40 of the repeating units: $R(AIRO)xAIR_2$ for linear species and $(AIRO)x$ for cyclic species. The R is a $C_1$–$C_8$ alkyl including mixed alkyls. Particularly desirable are the compounds in which R is methyl.

Alumoxane solutions, particularly methylalumoxane solutions, may be obtained from commercial vendors as solutions having various concentrations. Particularly desirable are the compounds in which R is methyl or other lower alkyls such as $C_3$–$C_8$, now commercially sold by AKZO as "modified Alumoxane". There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, and 5,103,031, and EP-A-0 561 476, EP-B1-0 279 586, EP-A-0 594-218 and WO 94/10180, each fully incorporated herein by reference for purposes of U.S. practice. (as used herein unless otherwise stated "solution" refers to any liquid containing mixture including suspensions.)

Ionizing activators may also be used to activate metallocenes. These activators are neutral or ionic, or are compounds such as tri(n-butyl)ammonium tetrakis (pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference for purposes of U.S. patent practice). These teach a desirable method of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" (NCA) means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, for example, EP-A-0 426 637 and EP-A- 0 573 403 (incorporated herein by reference for purposes of U.S. patent practice). An additional method of making the ionic catalysts uses ionizing anion precursors which are initially neutral Lewis acids but form the cation and anion upon ionizing reaction with the metallocene compounds, for example the use of tris(pentafluorophenyl) borane. See EP-A-0 520 732 (incorporated herein by reference for purposes of U.S. patent practice). Ionic catalysts for addition polymerization can also be prepared by oxidation of the metal centers of transition metal compounds by anion precursors containing metallic oxidizing groups along with the anion groups, see EP-A-0 495 375 (incorporated herein by reference for purposes of U.S. patent practice).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference for purposes of U.S. patent practice) for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. No. 5,643,847, U.S. patent application Ser. No. 09/184,358, filed Nov. 2, 1998 and U.S. patent application Ser. No. 09/184,389, filed Nov. 2, 1998 (all fully incorporated herein by reference for purposes of U.S. patent practice).

When the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

Support Materials

The catalyst systems used in the process of this invention are desirably supported using a porous particulate material, such as for example, talc, inorganic oxides, inorganic chlorides and resinous materials such as polyolefin or polymeric compounds.

Desirably, the support materials are porous inorganic oxide materials, which include those from the Periodic Table of Elements of Groups 2, 3, 4, 5, 13 or 14 metal oxides. Silica, alumina, silica-alumina, and mixtures thereof are particularly desirable. Other inorganic oxides that may be employed either alone or in combination with the silica, alumina or silica-alumina are magnesia, titania, zirconia, and the like.

Desirably the support material is porous silica which has a surface area in the range of from 10 to 700 m$^2$/g, a total pore volume in the range of from 0.1 to 4.0 cc/g and an average particle size in the range of from 10 to 500 $\mu$m. More desirably, the surface area is in the range of from 50 to 500 m$^2$/g, the pore volume is in the range of from 0.5 to 3.5 cc/g and the average particle size is in the range of from 20 to 200 $\mu$m. Most desirably the surface area is in the range of from 100 to 400 m$^2$/g, the pore volume is in the range of from 0.8 to 3.0 cc/g and the average particle size is in the range of from 30 to 100 $\mu$m. The average pore size of typical porous support materials is in the range of from 10 to 1000 Å. Desirably, a support material is used that has an average pore diameter of from 50 to 500 Å, and most desirably from 75 to 350 Å. It may be particularly desirable to dehydrate the silica at a temperature of from 100° C. to 800° C. anywhere from 3 to 24 hours.

The metallocenes, activator and support material may be combined in any number of ways. Suitable support techniques are described in U.S. Pat. Nos. 4,808,561 and 4,701,432 (each fully incorporated herein by reference for purposes of U.S. patent practice.). Desirably, the metallocenes and activator are combined and their reaction product supported on the porous support material as described in U.S. Pat. No. 5,240,894 and WO 94/28034, WO 96/00243, and WO 96/00245 (each fully incorporated herein by reference for purposes of U.S. patent practice.) Alternatively, the metallocenes may be preactivated separately and then combined with the support material either separately or together.

If the metallocenes are separately supported, then desirably, they are dried then combined as a powder before use in polymerization.

Regardless of whether the metallocenes and their activator are separately precontacted or whether the metallocenes and activator are combined at once, the total volume of reaction solution applied to porous support is desirably less than 4 times the total pore volume of the porous support, more desirably less than 3 times the total pore volume of the porous support and even more desirably in the range of from more than 1 to less than 2.5 times the total pore volume of the porous support. Procedures for measuring the total pore volume of porous support are well known in the art. One such method is described in Volume 1, Experimental Methods in Catalyst Research, Academic Press, 1968, pages 67–96.

Methods of supporting ionic catalysts comprising metallocene cations and noncoordinating anions are described in WO 91/09882, WO 94/03506, WO 96/04319 and U.S. Pat. Nos. 5,763,080 and 5,726,103 (each herein incorporated by reference for purposes of U.S. practice). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference for purposes of U.S. patent practice.

Additives

Additives may be included in the propylene polymer of this invention. Such additives and their use are generally well known in the art. These include those commonly employed with plastics such as heat stabilizers or antioxidants, neutralizers, slip agents, antiblock agents, pigments, antifogging agents, antistatic agents, clarifiers, nucleating agents, ultraviolet absorbers or light stabilizers, fillers and other additives in conventional amounts. Effective levels are known in the art and depend on the details of the base polymers, the fabrication mode and the end application.

Foaming Agents

Foaming agents or additives may generally be divided into two classes: physical foaming agents and chemical foaming agents.

Examples of physical foaming or blowing agents include carbon dioxide, nitrogen, heptane, helium, butane, isobutane and isopentane. Hydrocarbon gases, such as butane or pentane and fluorocarbon gases, such as trichlorofluoromethane and dichlorodifluromethane are effective as physical blowing agents producing good quality foams. Because hydrocarbon and fluorocarbon gases are viewed as presenting certain health and environmental concerns, the use of these gases is generally not the most desirable. More desirable physical blowing agents are carbon dioxide, nitrogen and argon. Physical blowing agents are utilized when low foam densities ($\leq 0.5$ g/cm$^3$) are required.

Chemical blowing agents allow the production of foamed products having a density of generally greater than 0.5 g/cm$^3$. Examples of chemical blowing agents include bicarbonate of soda (used typically in combination with citric acid), azodicarbonamide, sulfonyl hydrazide, sulfonyl semicarbazide. Bicarbonate of soda (endothermic agent) and azodicarbonamide (exothermic agent) are perhaps the most widely used chemical blowing agents.

Foamed articles or products made from polymer from these multistaged reactor processes are anticipated to have a more uniform foam cell morphology and good extrudate skin surface. More particularly, the propylene polymers foams of the present invention may be useful in applications such as, for example, sheet extrusion and molded parts. In instances where the application is sheet extrusion, the foamed sheets can be subsequently thermoformed into articles, such as packaging containers. In instances where the application is for molded parts, particular examples of molded parts include molded parts related to and used in the automotive industry, such as for example bumpers, side panels, floor mats, dashboards and instrument panels. Examples of other applications for which foamed plastic, such as foamed propylene, may be useful, as well as foaming methods, are described in the Encyclopedia of Chemical Technology, by Kirk-Othmer, Fourth Edition, vol. 11, at pages 730–783, which are incorporated by reference herein for purpose of U.S. practice.

When used at low levels, generally less than 1 wt %, and typically around 0.25 wt % based on the weight of the polymer being foamed, chemical blowing agents may function as bubble nucleating agents and facilitate the formation of more uniformly sized bubbles. This function is often utilized even when the primary foaming medium is a physical blowing agent, such as carbon dioxide gas. Talc can also be utilized for bubble nucleation.

EXAMPLES

Samples 1, 2A and 2B are propylene polymers consistent with this invention. These polymers were compared against several metallocene-based and conventional Ziegler-Natta based propylene polymers as follows. Sample 3 was prepared from the same metallocene catalyst system (comprising two metallocenes) used to make Samples 1, 2A and 2B, but without using any comonomer. Sample 4 was prepared from a single metallocene-based catalyst and is a homopolymer. The Ziegler-Natta produced propylene polymers are Samples 5 and 6. Sample 5 is a polymer of controlled crystallinity, comprising a reactor blend of propylene homopolymer and propylene copolymer, similar to the invention polymers but prepared from conventional Ziegler-Natta catalyst. Product PP4792E1 is an example of Sample 5. Sample 6 is a conventional random copolymer polypropylene. Product PP4822 is an example of Sample 6. The Ziegler-Natta products above (Samples 5 and 6) are available commercially from ExxonMobil Chemical Company, Houston Tex.

Table 1 provides characterization data describing Samples 1 to 6. The MFR values (melt flow rate) were determined under ASTM D1238 Condition L. Comonomer ($C_2$, ethylene) content was determined via FTIR measurements (calibrated versus C13 NMR). The melt temperatures were measured using DSC at 10° C./min heating and cooling rates using a Perkin Elmer DSC 7 Differential Scanning Calorimeter. The dual metallocene catalyst is designated "2 MCNs", a single metallocene is designated "1 MCN", and the Ziegler-Natta catalyst is designated as "Z-N".

The copolymer, Sample 1, was prepared by using a catalyst system that employed an equimolar mix of two metallocenes on a silica support. The catalyst system was prepared as follows. In an inert nitrogen atmosphere, 8.0 g of rac dimethylsilanediylbis(2-methyl-4-phenylindenyl)

zirconium dichloride was combined with 6.0 g of dimethylsilanediylbis(2-methyl-indenyl)zirconium dichloride and 780 g of 30 wt % methylalumoxane solution in toluene (Albemarle Corporation, Baton Rouge, La.). 860 g of toluene was added to dilute the solution. Separately, 939 g MS948 silica (1.6 cc/g pore volume, available from Davison Chemical Division of W. R. Grace, Baltimore, Md.) previously dehydrated to 600° C. in a stream of flowing $N_2$, was charged to the catalyst preparation vessel. With the agitator engaged, the metallocene-aluminoxane solution was added to the silica. After addition of the solution, mixing continued for one hour and then vacuum was applied to the vessel. A slight nitrogen purge was added to the bottom of the vessel to aid in removing the volatiles. At the end of drying, 1454 g of free flowing solid was obtained. Analysis of the solid showed a loading of 8.95 wt % Al and 0.17 wt % Zr with an Al/Zr molar ratio of 180.

Several batches of the catalyst system were combined to provide sufficient charge for the polymerization run. The catalyst system was oil slurried (20 parts by weight to 80 parts by weight DRAKEOL™ 35 available from Penreco, Dickinson, Tex.) for ease of addition to the reactor.

The procedure for polymerizing Sample 1 was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. Catalyst was fed at an estimated rate of 5 g/hr. Triethylaluminum (TEAL) was employed as a scavenger and fed at a rate of 160 ml/hr of a 2 wt % solution of TEAL in hexane solvent. Propylene was fed at a rate of about 73 kg/hr to the first reactor and about 27.5 kg/hr to the second reactor. Ethylene comonomer was added only to the second reactor at a feed rate as needed to result in an overall incorporation of about 0.8 wt % ethylene in the final polymer. Hydrogen was added for molecular weight control at 500 mppm in the first reactor. No addition of fresh hydrogen was fed to the second reactor. Residence times were about 2.75 hours in the first reactor and about 2 hours in the second reactor. The production rate of polymer was about 32 kg/hr. The polymer was discharged from the reactors as a granular product having an MFR of about 2.0 dg/min and ethylene level of about 0.8 wt %. Evaluation of the intermediate product from the first reactor showed a homopolypropylene with an MFR of 4.0.

The Sample 2A was prepared using the same catalyst system and polymerization procedure as described above for Sample 1. The only difference was a slight increase in the ethylene comonomer feed to the second reactor, resulting in an overall ethylene incorporation in the final product of about 1.0 wt %. The final granular polypropylene product had an MFR of about 1.0; that of the intermediate product from the first reactor about 4.0. Both polymers, Samples 1 and 2A, comprise a reactor blend of a high(er) MFR homopolypropylene with a low MFR random copolymer.

The Sample 2B was prepared using a similar catalyst system and polymerization procedure as described above for Samples 1 and 2A, with some modifications. One catalyst, MS952 silica (Davidson Chemical, Division of W. R. Grace, Baltimore, Md.), previously dehydrated to 600° C. under $N_2$ was used instead of MS948. Also, following the addition of the metallocene/alumoxane mixture to the silica, a solution containing Kemamine AS-990 (Witco Corporation, Greenwich, Conn.) in toluene (1 wt % of AS-990 based on weight of silica) was added to the slurry before drying. Upon reactor polymerization, the reactor levels were adjusted to provide a 70%1/30% split between product made in the first and second reactors, versus a 55%/45% split during the production of Samples 1 and 2A.

The Sample 3 was also prepared using the two-metallocene mix described above. Several batches of the catalyst were combined to provide the charge for the polymerization run. The catalyst system was oil slurried (15 wt %) for ease of addition to the reactor.

The procedure for polymerizing Sample 3 was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. Catalyst was fed at an estimated rate of 13.5 g/hr. TEAL was employed as a scavenger and fed at a rate of 2 ml/min of a 2 wt % solution of TEAL in hexane. Propylene was fed at a rate of about 65.8 kg/hr to the first reactor and about 27.2 kg/hr to the second reactor. Hydrogen was added for molecular weight control at 500 mppm in the first reactor and 900 mppm in the second reactor. Residence times were about 3 hours in the first reactor and about 2 hours in the second reactor. The production rate of polymer was about 25 kg/hr. The final polymer was discharged from the reactors as a granular homopolymer product having an MFR of 2.0 dg/min.

The Sample 4 was prepared using the metallocene catalyst system rac dimethylsilylbis(2-methyl-4-phenylindenyl)zirconium dichloride, activated with methylalumoxane and supported on silica. The catalyst system was prepared in the following manner.

A precursor solution was prepared by combining 343 g of 30 wt % methylalumoxane in toluene (Albemarle Corp., Baton Rouge, La,.) representing 1.76 moles Al with 6.36 g of dimethylsilylbis(2-methyl-4-phenyl-indenyl)zirconium dichloride (0.01 moles Zr) by stirring. Then, 367 g of toluene was added and stirring was continued for 15 minutes. The precursor solution (625.9 g) was added to 392 g of Davison MS 948 silica (1.6 cc/g pore volume, available from W. R. Grace, Davison Chemical Division, Baltimore, Md) previously heated to 600° C. under $N_2$. The ratio of liquid volume to total silica pore volume was 1.10. The solid had the consistency of damp sand and wad dried at reduced pressure (483+mmHg vacuum) and temperatures as high as 50° C. over 16 hours. 485.5 g of finely divided, free-flowing solid catalyst was obtained. Elemental analysis showed 0.09 wt % Zr and 7.37 wt % Al.

Several batches of catalyst system were combined to provide the charge for the polymerization run. The catalyst system was oil slurried (DRAKEOL™, 15 wt %) for ease of addition to the reactor. The procedure for polymerizing Sample 4 was as follows. The polymerization was conducted in a pilot scale, two reactor, continuous, stirred tank, bulk liquid-phase process. The reactors were equipped with jackets for removing the heat of polymerization. The reactor temperature was set at 70° C. in the first reactor and 66° C. in the second reactor. Catalyst was fed at a rate of 6.6 g/hr. TEAL (2 wt % in hexane) was used as a scavenger at a rate of 1.6 g/hr. The catalyst system prepared above was fed as a 15% slurry in mineral oil and flushed into the reactor with propylene. Propylene monomer was fed to the first reactor at a rate of 73 kg/hr and to the second reactor at a rate of 27 kg/hr. Reactor residence time was about 2.3 hours in the first reactor and about 1.7 hours in the second reactor. Polymer production rates were about 16 kg/hr in the first reactor and 8 kg/hr in the second reactor. Polymer was discharged from the reactors as granular product having an MFR of 4.3 dg/min.

Figure 1:
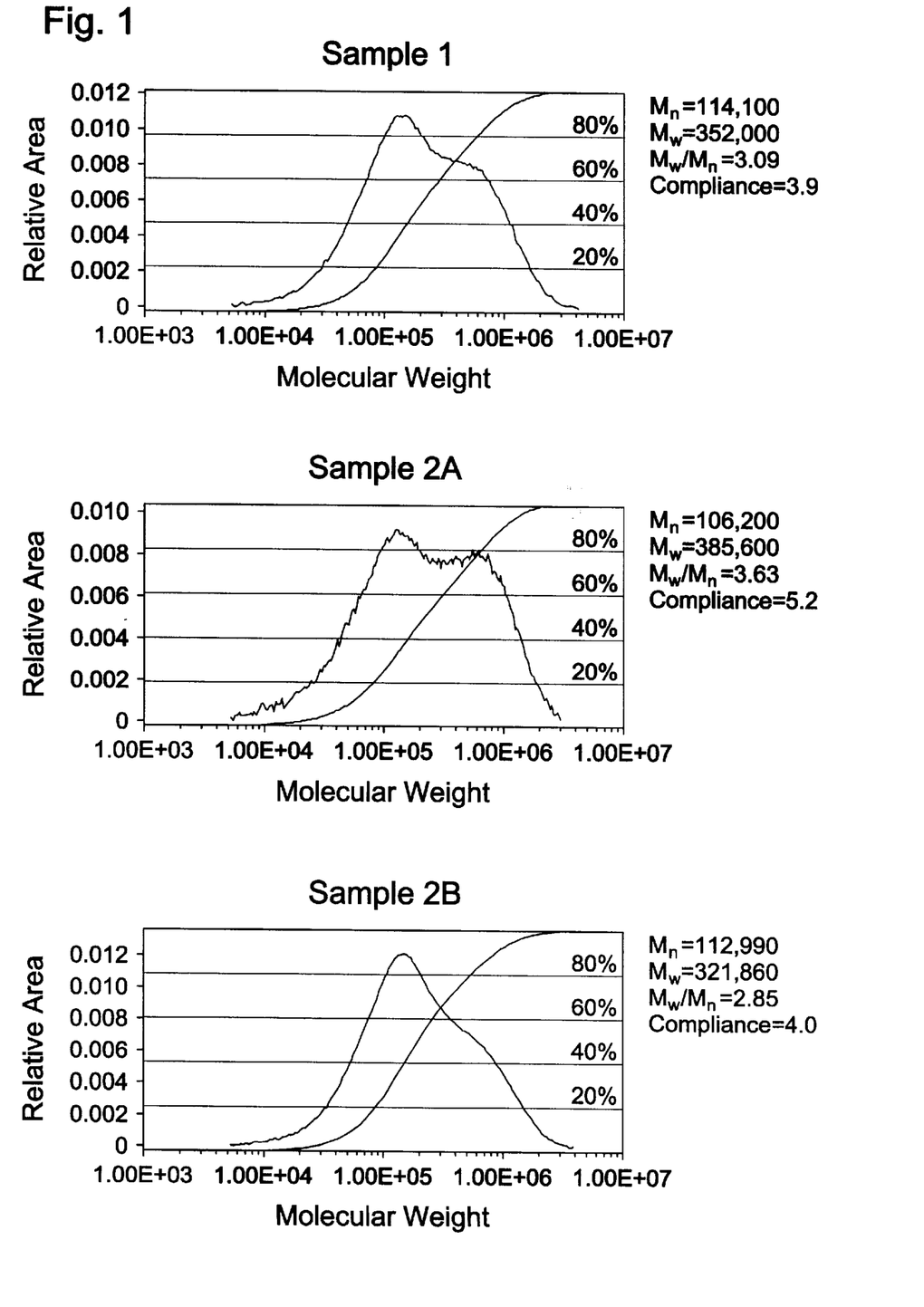
FIG. 1 is GPC molecular weight distribution data represented in a series of graphs for Samples 1, 2A, 2B, 3, and 4.

The molecular weight distributions of the metallocene-based samples (Samples 1–4) are shown in FIG. 1. Sample 4 is derived from a single metallocene-based catalyst, while Samples 1, 2A, 2B and 3 are derived from a two-metallocene-based catalyst. Sample 4 shows a characteristic narrow molecular weight distribution, typical of single site metallocene catalyzed polymers. Of the two-metallocene catalyzed polymers, homopolymer Sample 3 shows a modestly broadened molecular weight distribution, reflecting contributions from the two individual metallocenes.

Surprisingly, Samples 1, 2A and 2B, show an unexpected bimodal molecular weight distribution. The incorporation of less than or equal to 1 wt % ethylene comonomer during the polymerization process results in a substantial broadening of the molecular weight distribution at the high molecular weight end. This is unexpected since with both the individual metallocenes, molecular weight drops with ethylene addition.

Figure 2:
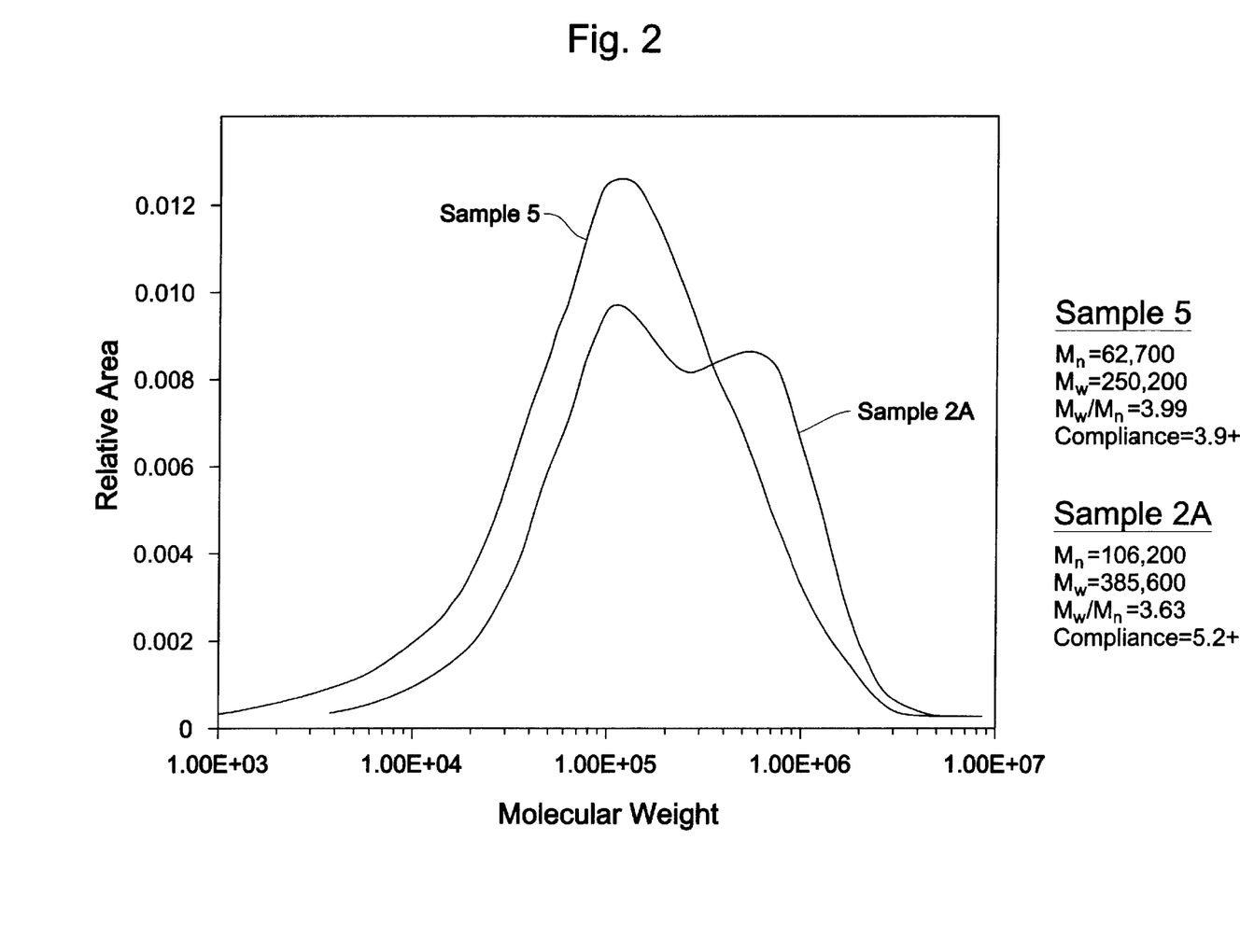
FIG. 2 is GPC molecular weight distribution data represented in a graph for Sample 5.

A comparison of the molecular weight distribution of an invention polymer (Sample 2A) versus one made by the same process (i.e., addition of ethylene comonomer in a separate polymerization stage) but using a conventional Ziegler-Natta catalyst (Sample 5) is shown in FIG. 2. The extent of molecular weight broadening to the high end for the invention polymer is clearly visible.

This substantial molecular weight broadening at the high molecular weight end for the invention polymers can be characterized by several techniques, one of which is the measurement of recoverable compliance (see FIGS. 1 and 2), the value of which is well known to track the high molecular weight end species of the distribution. The compliance values are observed to increase from $1.1 \times 10^{-4}$ $Pa^{-1}$ for Sample 4 (single metallocene) to $3.6 \times 10^{-4}$ $Pa^{-1}$ for Sample 3 (two metallocene) to greater than or equal to $3.9 \times 10^{-4}$ $Pa^{-1}$ for invention polymers Samples 1, 2A, and 2B (two metallocene).

The presence of increased levels of high molecular weight species together with a broadened molecular weight distribution is favorable in the fabrication of extruded foams. The high molecular weight species offer increased melt strength, which is desirable to attain enhanced control of the foaming step. Higher melt strength enables the controlled growth of foam cells, allowing the fabricator to achieve low foam product densities. In addition, it also provides higher levels of bubble stability, which is desirable to maintain a high ratio of closed to open foam cells during the fabrication.

The attribute of high melt strength for good foam properties coupled with a broad molecular weight distribution for good extrusion processability offers foam fabricators a very desirable resin. High melt strength is also attained by going to fractional MFR resins, however, there is a penalty in that these fractional MFR polymers are difficult to process on standard thermoplastic extrusion equipment.

Figure 3:
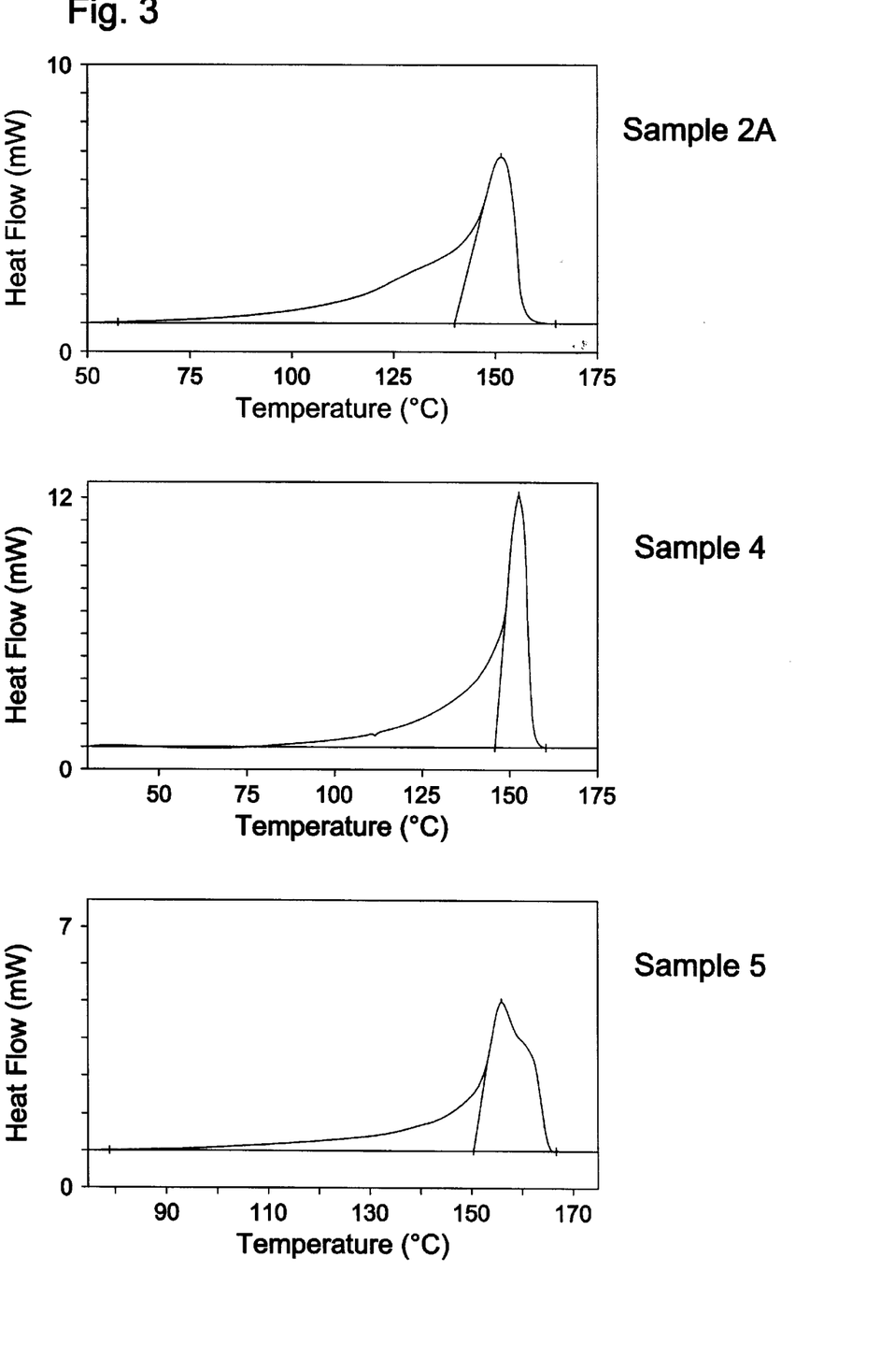
FIG. 3 is DSC melting distribution data represented in a series of graphs for Samples 2A, 4, and 5.

The incorporation of ethylene (comonomer) in the invention polymers broadens the melting distribution as is seen in the DSC melting data in FIG. 3. Shown in the figure are the invention polymer, Sample 2A, the single metallocene control, Sample 4, and the Ziegler-Natta polymer, Sample 5, prepared in a similar fashion to the invention polymers. An additional observation from FIG. 3 is that the invention polymers (Sample 2A) do not show any high temperature melting peaks or shoulders, as is displayed by Sample 5. In the foaming process, it is desirable to keep the melt at a relatively low temperature (e.g., melt temperature at approximately 145° C.). At these temperatures, the diffusion tendency of the gaseous blowing agent is lowered, keeping more of the gas in the system. Additionally, the lower die temperatures enable better foam stability and reduced volumetric shrinkage of the final foamed profile. The invention polymers are well suited for foaming operations utilizing low die temperatures. In contrast, the Ziegler-Natta Sample 5 with its high(er) temperature peak/shoulder runs the risk of freezing off at the die-end at low die temperatures. Alternately, crystallization can occur on the screw surface at the front end of the screw before the die, causing a reduction in screw channel depth. This lowers the screw's pumping capacity, which can lead to a reduction in die pressure and eventual collapse of the foamed cell structure. In severe cases, excessive pressure build up and polymer freeze-up due to crystallization can lead to breakage of the screw.

To gauge the extensibility of the material in the cell walls of a foamed structure, stretching measurements at elevated temperatures, comparable to the temperatures at the die in a gas foaming operation, were conducted.

These stretching measurements were conducted on an Instron Machine (Model 1122) as follows. Cast extruded sheet (typically 600 µm thick) was cut along the machine direction (MD) into strips 76.2 mm wide. A strip was gripped between the jaws on the Instron. An appropriate length of strip was cut to allow a jaw separation of 25.4 mm. The sample was maintained in an environmental chamber on the Instron at a temperature of 110° C. The temperature thermocouple probe was positioned adjacent to the sample. The sample was stretched to 700% along the MD in the Instron at a temperature of 110° C. and a stretching rate of 50.8 mm/min. After the MD stretching, the sample was held at 700% extension while the chamber doors were opened and the sample allowed to cool down to ambient temperature. The sample (about 100 µm thick) was removed from the chamber and cut along the original transverse direction (TD) into 25.4 mm wide strips. A strip of appropriate length was again gripped between jaws on the Instron.

TD stretching was then conducted using the following conditions. 25.4 mm jaw separation, 1100%TD stretching ratio, 508 mm/min stretching speed, different stretching temperatures varying from 100° C. to 150° C. The strain rate for this stretching condition is about 2200% per minute. Stretching results are shown in Table 2. The data shown are TD tensile strengths (MPa) for the different samples over the range of testing temperatures.

Not all of the samples were able to endure these rigorous stretching conditions and remain unbroken, displaying good extensibility. Breaks were noted in the data measurements and are indicated in Table 2 by the notation "B". The tensile strengths, and elongations at break in some instances, at the break conditions are entered in parentheses after the "B" notation. For the samples that survived the stretching unbroken, the tensile strengths at 1100% stretching ratio are reported. Two test specimens per sample were evaluated, values are reported as averages for the two.

The stretching data in Table 2 show the TD tensile strengths at 1100% stretching ratio and the break points for those samples that broke prior to achieving this stretching level. For all samples, the propensity to break before reaching 1100% TD stretching is greater at the lower temperatures. The superiority of the invention polymers (Samples 1 and 2A) in being able to offer high levels of extensibility at temperatures around 120° C. to 150° C. is clearly seen in the data. They withstand breaking much better than the mixed metallocene polymer (Sample 3) or the single metallocene polymer (Sample 4). Likewise, their performances are superior to the Ziegler-Natta controls (Samples 5 and 6). As noted earlier, Sample 5 is a polymer of controlled crystallinity similar to the invention polymers, but derived from a Ziegler-Natta catalyst. The data in Table 2 is plotted in FIGS. 4A and 4B.

TABLE 1

Description of Samples

| Sample | Catalyst | MFR (dg/min) | Comonomer (wt %) | DSC Melting Temp. (° C.) |
|---|---|---|---|---|
| 1 | 2 MCNs | 2.1 | $C_2$ (0.8) | 147.1 |
| 2A | 2 MCNs | 1.0 | $C_2$ (1.0) | 146.5 |
| 2B | 2 MCNs | 1.7 | $C_2$ (0.8) | 146.7 |
| 3 | 2 MCNs | 2.0 | none | 151.0 |
| 4 | 1 MCN | 4.3 | none | 151.0 |
| 5 | Z-N | 2.6 | $C_2$ (0.55) | 157.1 |
| 6 | Z-N | 3.4 | $C_2$ (0.4) | 156.3 |

TABLE 2

Instron Stretching Measurements

| TD Stretching Temp. (° C.) | Sample 1 (Tm = 147.1° C.) | Sample 2A (Tm = 146.5° C.) | Sample 3 (Tm = 151° C.) | Sample 4 (Tm = 151° C.) | Sample 5 (Tm = 157.1° C.) | Sample 6 (Tm = 156.3° C.) |
|---|---|---|---|---|---|---|
| 100 | B | B (1025%) | — | — | — | — |
| 110 | B (970%) | 9.8 | — | — | — | — |
| 120 | 8.2 | 7.5 | — | — | — | — |
| 130 | 6.6 | 7.4 | B (9.0) | B (8.4) | B (7.5) | B (7.0) |
| 135 | 6.3 | 6.4 | B (7.5) | B (7.9) | B (6.0) | B (7.1, 935%) |
| 140 | 4.5 | 5.3 | B (7.8, 1050%) | B (6.9) | B (6.7) | 6.0 |
| 145 | 3.2 | — | 6.3 | B (5.3) | B (5.9, 965%) | 5.0 |
| 150 | 3.1 | 3.7 | 5.1 | B (4.8, 900%) | 5.1 | 4.8 |

Figure 4A:
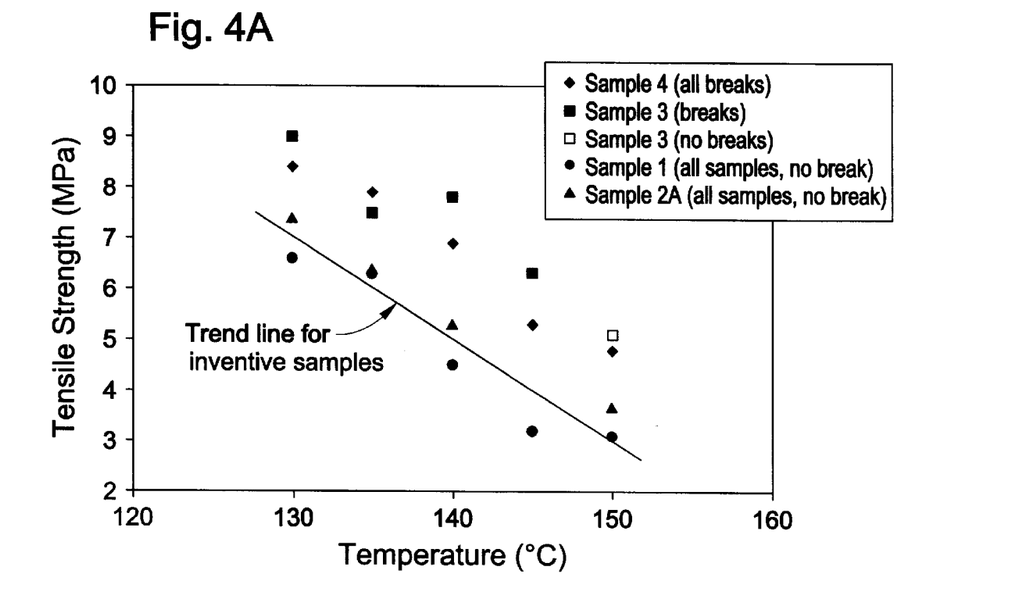
FIG. 4A is tensile strength testing data represented in a series of data points in a graph of Tensile Strength as a function of Temperature, the data corresponding to Samples 1, 2A, 3, 4, and 5.
Figure 4B:
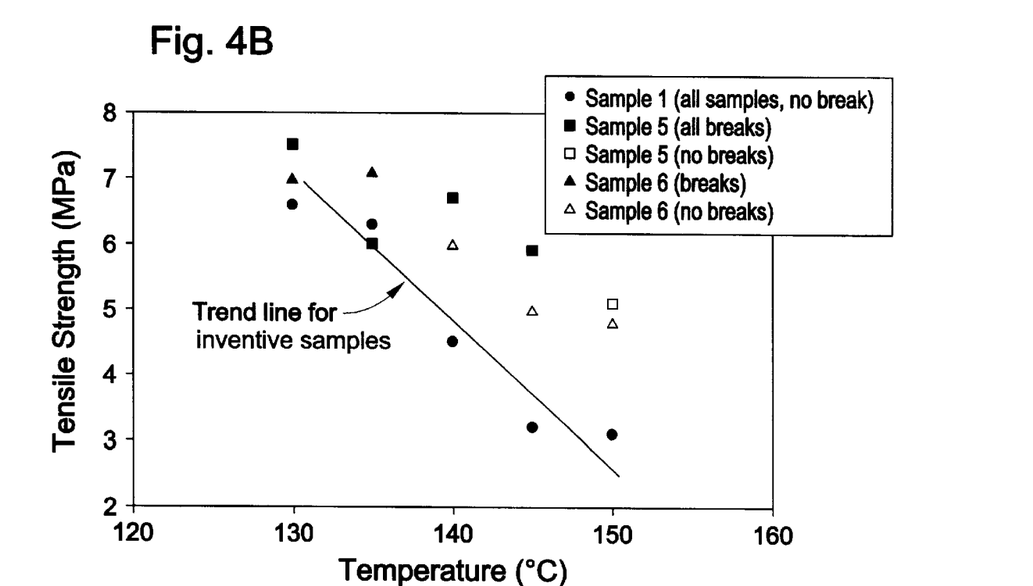
FIG. 4B is tensile strength testing data represented in a series of data points in a graph of Tensile Strength as a function of Temperature, the data corresponding to Samples 1, 5, and 6.

The FIGS. 4A and 4B demonstrate the uniqueness of the polymers of the invention. The polymers display good extensibility over a broader temperature range than either of the other metallocene polymers (homopolymers from one or two metallocenes) or the Ziegler-Natta polymers (controlled crystallinity random copolymers similar to the invention products, and conventional random copolymers). The temperature range of the experiment (130° C.–150° C.) covers temperatures where there is appreciable partial melting, thereby involving the extensibility of a mix of solid and molten materials, not unlike the case that exists for a foam developing from a molten extrudate. An additional observation from the data in Table 2 and FIG. 4A and 4B is that the invention polymers shown the lowest tensile strengths (i.e., more stretchable) of the polymers tested, under the conditions used.

The above data points to an advantage for the invention polymers in a foaming operation. The good extensibility, without breaking, is desirable to maintain cell wall integrity during the cell growth step. This maintenance of cell wall integrity promotes the formation of a high percentage of closed cells which in turn allows the fabricator to achieve the low foam densities which are desired in many foam product applications. The low tensile strength values suggest easy stretchability of the cell wall for a given amount of blowing agent.

While the present invention has been described and illustrated by reference to particular embodiments, it will be appreciated by those of ordinary skill in the art, that the invention lends itself to many different variations not illustrated herein. For these reasons, then, reference should be made solely to the appended claims for purposes of determining the true scope of the present invention.

We claim:

1. A process for forming a polypropylene polymer foam comprising:
   (a) polymerizing propylene in a first stage;
   (b) copolymerizing propylene and a comonomer in a second stage in the presence of the product of the first stage;
   (c) recovering crystalline propylene polymer product comprising from 0.05 to 15 weight percent comonomer based on the total weight of the crystalline propylene polymer;
   wherein the polymerization steps (a) and (b) are conducted in the presence of a metallocene catalyst system comprising two different metallocene catalyst components; and
   (d) contacting the crystalline polypropylene polymer product with a foaming agent such that the polypropylene polymer foam is formed.

2. The process of claim 1 wherein the polypropylene polymer product comprises:
   a) from 10 to 90 weight percent isotactic propylene homopolymer having a molecular weight distribution less than 3.0;
   b) from 90 to 10 weight percent propylene copolymer comprising propylene units and a comonomer, wherein the propylene copolymer has a molecular weight distribution less than 3.0, and wherein the comonomer weight percent based on the total propylene polymer weight is in a range from 0.1 to 10; and
   wherein the propylene polymer has a molecular weight distribution (Mw/Mn) in a range from 2.1 to 10.

3. The process of claim 2 wherein the comonomer weight percent is in a range from 0.5 to 8.

4. The process of claim 2 wherein the comonomer weight percent is in a range from 0.5 to 5.

5. The process of claim 2 wherein the comonomer is selected from a group consisting of ethylene, 1-butene, 1-pentene, 1-hexene, and 1-octene.

6. The process of claim 2 wherein the propylene polymer foam is further formed into a molded article.

7. The process of claim 1 wherein the polymer comprises:
   a) from 10 to 90 weight percent isotactic propylene homopolymer having a molecular weight distribution less than 3.0 and a first molecular weight in a first molecular weight range; and
   b) from 90 to 10 weight percent propylene copolymer comprising propylene units and a comonomer, wherein the propylene copolymer has a molecular weight distribution less than 3.0 and a second molecular weight greater than the first molecular weight, and wherein the comonomer weight percent based on total propylene polymer weight is in a range from 0.1 to 10;
   wherein the crystalline propylene polymer has a molecular weight distribution (Mw/Mn) in a range from 2.1 to 10.

8. The process of claim 7 wherein the comonomer weight percent is in a range from 0.5 to 8.

9. The process of claim 7 wherein the comonomer weight percent is in a range from 0.5 to 5.

10. The process of claim 7 wherein the first molecular weight range is from 25,000 to 300,000.

11. The process of claim 7 wherein the second molecular weight is in a range from greater than 300,000 to 1,500,000.

12. The process of claim 7 wherein the comonomer is selected from the group consisting of ethylene, 1-butene, 1-pentene, 1-hexene, and 1-octene.

13. The process of claim 7 wherein the propylene polymer foam is further formed into a molded article.

14. The process of claim 1 wherein the propylene polymer comprises:
   a) from 30 to 70 weight percent isotactic propylene homopolymer having a molecular weight distribution less than 2.5 and a first molecular weight in a range from 25,000 to 300,000; and
   b) from 70 to 30 weight percent propylene copolymer comprising propylene monomers and a comonomer, wherein the propylene copolymer has a molecular weight distribution less than 2.5, and wherein the comonomer weight percent based on total propylene polymer weight is in a range from 0.5 to 8, and wherein the comonomer is selected from the group consisting of ethylene, 1-butene, 1-pentene, and 1-hexene, and; wherein the propylene copolymer has a molecular weight distribution (Mw/Mn) in a range from 2.5 to 7.0, a weight average molecular weight in a range from 200,000 to 400,000 and a melt flow rate in a range from 0.5 dg/min to 20.0 dg/min.

15. The process of claim 14 wherein the comonomer weight percent is in a range from 0.8 to 2.

16. The process of claim 14 wherein the first molecular weight range is from 100,000 to 300,000.

17. The process of claim 14 wherein the second molecular weight is in a range from greater than 300,000 to 1,500,000.

18. The process of claim 14 wherein the crystalline propylene polymer foam is formed into a molded article.

* * * * *